United States Patent [19]

Giconi

[11] 3,987,307

[45] Oct. 19, 1976

[54] PARTICULATE MATERIAL POWERED PRIME MOVER

[76] Inventor: Renell A. Giconi, 12 Park Drive, LaVale, Md. 21502

[22] Filed: Dec. 11, 1974

[21] Appl. No.: 531,606

[52] U.S. Cl. ................................. 290/1 D; 290/42; 198/711; 46/41
[51] Int. Cl.² ............................................ H02P 9/04
[58] Field of Search ............. 46/41; 273/1 E; 290/1; 198/127 E, 141, 203

[56] References Cited

UNITED STATES PATENTS

| | | | |
|---|---|---|---|
| 1,254,320 | 1/1918 | Fitzgerald | 290/1 D |
| 1,276,112 | 8/1918 | Reed | 290/42 |
| 1,375,881 | 4/1921 | Wilsen | 198/141 |
| 1,550,619 | 8/1925 | Kingsley | 46/41 |
| 2,890,532 | 6/1959 | Ellison | 198/141 |
| 3,209,899 | 10/1965 | Friedmann | 198/141 |

*Primary Examiner*—Gerald P. Tolin
*Attorney, Agent, or Firm*—Eric P. Schellin; Brian Ribando

[57] ABSTRACT

There is disclosed a prime motive means powered by the tailings of mines, the crushed material emanating from quarries and/or the earth removed in strip mining operations. The system takes advantage of the fact that in any mine-like operation a relatively large hole is produced which extends for a finite distance below the normal topography of the surface of the surrounding land. The system includes a driven wheel mounted in a horizontal axis having particulate matter receiving means at the outermost circumference thereof. The wheel is located near substantially the bottom of the quarry or pit. Guidance means are provided to discharge the aforementioned particulate material from the upper reaches of the quarry or pit onto the flights or buckets of the driven wheel. The wheel, as in the case of a water wheel, discharges the particulate material onto a slide. The particulate material then slides to an area of accumulation adapted and constructed to make the particulate material accessible to a vertically oriented endless conveyer system having buckets designed to carry the particulate material upwardly to a hopper from which the particulate material is then redistributed to the driven wheel. The endless conveyer is driven by suitable means such as an electric motor or internal combustion engine. The driven wheel may be suitably coupled through transmission means to an electric generator. The current produced by the generator may be used to supplement the requirements of the motive means employed to drive the endless conveyer system.

8 Claims, 2 Drawing Figures

PARTICULATE MATERIAL POWERED PRIME MOVER

BACKGROUND OF THE INVENTION

There has recently been considerable concern with respect to the energy requirements of this country. It has already been determined that there are many areas not yet explored of obtaining energy from sources that previously have been totally ignored. For instance, the use of gravity for generating power is essentially ignored except for some utilization of water power. Gravity can be employed wherever a mass is positioned at a certain height from which it may be dislodged to assume a lower position with reference to a position to the center of the earth. As the mass is moved from the upper to the lower position it may be used to rotate or drive a suitable means which in turn is employed to drive an energy consuming device such as an electric generator or conveyor or both. Of course, when the mass employed is water it is fairly easy to convey it from a high position to a lower position. At the same time when the mass comprises particulate material it can also be employed as such particulate material may assume some of the characteristics of a fluid depending, of course, on the fineness of the mass.

In the quarrying of rock or marble a rather deep pit is produced. Similarly, when strip mining is undertaken the earth mantle is first removed to thereby reveal the underlying deposit of mineral that is desired which may be coal or shale. All of these techniques have in common the creation of a depression in the earth's surface to produce an area considerably lower than the surrounding countryside. Additionally, as a by-product of the operation, there is produced a substantial quantity of particulate material which has little or no use. As a matter of fact, the material is usually something that must somehow be attended to. It is this particulate mass of material that has been discovered to be useful in generating and conserving energy.

SUMMARY OF THE INVENTION

Accordingly, the present invention employs the particulate material for generating energy which is the result of either a strip mining or a quarrying operation. Huge trucks are employed in a quarrying operation to remove the cut blocks of rock and granite. The quarry has a suitable rather steep road so that these trucks may ascend to the surface. At the surface, the block rocks are worked on in order to produce the desired configurations of the final product. While accomplishing this, considerable debris of particulate material results. This debris is employed to drive a wheel positioned at the bottom of the quarry. The particulate material is moved from its source to a storage hopper suitably constructed and located. A bulldozer may be used for the purpose of filling the hopper. The storage hopper possesses a suitably constructed chute for conveying the particulate material to the driven wheel where it is loaded into buckets positioned about the periphery thereof so that the weight of the particulate material and the kinetic energy of the falling particulate material drives the wheel. The particulate material is then permitted to flow into a sump. It may then be carried back to the surface by a driven endless bucket conveyer system. The endless conveyer system may be employed at times when the electric rates are lower and the driven wheel may be employed to generate electricity during high peak requirements.

If the endless conveyor system is not employed to raise the particulate material to the surface and/or the storage hopper, the driven wheel may be employed to drive an endless substantially disposed belt conveyor system for distributing the particulate material into other areas of the quarry to thereby make an attempt at finally disposing of the debris produced as a by-product of quarrying activity.

While the foregoing has been exemplary of a quarrying operation, it will be appreciated that the present invention contemplates using the principles thereof in alleviating the problems encountered with regard to coal strip mining and oil shale undertakings. In these latter embodiments, the overlaying debris and earth obtained as a result of the strip mining operation must be returned to the pit after the coal has been removed. New national legislation now requires that coal strip miners return the surface of the mine to essentially the same topography as before. In such an instance, a bulldozer may move the earth to a hopper from whence the material is charged to a driven wheel to either generate electricity or to power directly or indirectly an endless conveyor belt to distribute the material as necessary and as desirable.

Similarly with regard to shale containing oil utilization the resultant includes the production of enormous quantities of essentially useless rock that must be returned to the pits from which they came rather than to create huge piles of debris. Such rock may be usefully employed to drive an energy harnessing wheel as the rock is bulldozed back into the pits.

DETAILED DESCRIPTION OF THE INVENTION

Figure 1:
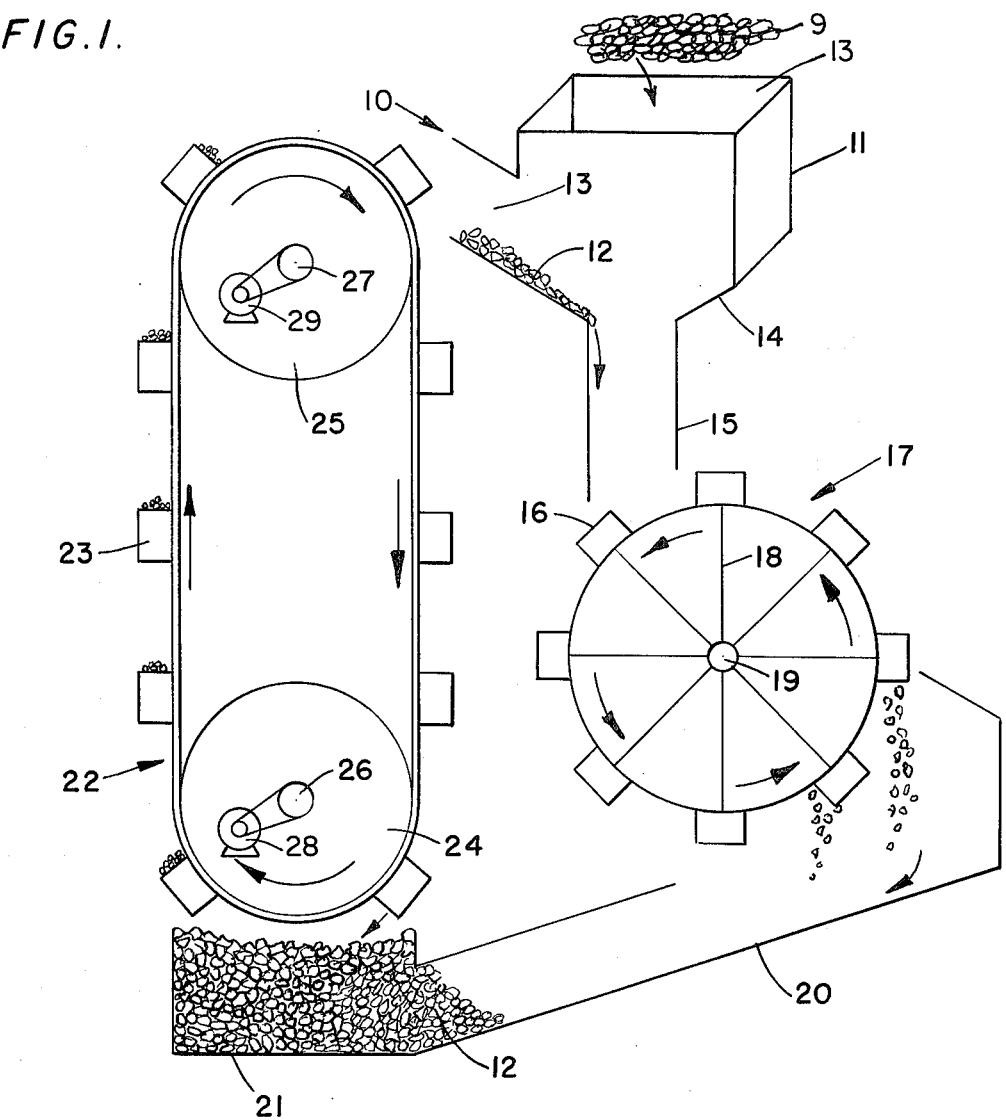
FIG. 1 is a side elevation view of one embodiment of the device and system of the present invention.

Turning to the drawings, attention is directed to FIG. 1 for a review of the system of the present invention. An apparatus 10 according to the invention is situated in a depression or excavation in the earth. The depression is created by conventional and well-known means as by cranes digging in the earth and loading trucks which transport the dislodged material out of the excavation area. Similarly, in a well-known manner, the debris from the excavating activities may be piled or distributed at the surface site of the depression as at 9. Additional debris is formed when the excavated material is comminuted as is conventional in quarrying or mining procedures. Positioned at a relatively high point in the depression is a hopper 11 for the storage of particulate material 12 having an ingress ports 13. The hopper 11 has a conventional sloping bottom 14 terminating into a downwardly descending chute 15. The terminus of the chute is arranged and constructed so that the material in the chute successively fills buckets 16 or flights positioned peripherally on a driven wheel 17 having a plurality of supporting spokes 18. The wheel 17 is on a horizontal axle 19. The particulate material 12 drives the wheel 17 by the kinetic force applied to the wheel due to the fall of the particulate material 12 and the weight thereof in the flights of the wheel. As the wheel 17 rotates the flights or buckets are successively emptied into inclined trough 20. The particulate material 12 accumulates in a sump 21. The sump 21 has mounted and operatively positioned thereinto a vertically movable endless conveyor 22 having buckets 23 positioned thereon. The system is designed to operate between pulley means 24 at the bottom and pulley means 25 which rotate on axles 26 and 27, respectively. One or both of the pulleys may be driven by suitable means such as by an electric motors 28 and 29 as shown or internal combustion engines.

By operating in the manner indicated, the endless conveyor system 22 carries the accumulated particulate material 12 to the surface of the quarry and especially to the hopper 11 through the ingress port 13. Additionally, material may be introduced into the hopper 11 from the debris 9 located at the rim of the excavation. Conventional means may be used to load the hoppers from the surface debris, such means including plows, power shovels, bulldozers, and the like. The thusly delivered particulate material 12 may then be used to again drive the wheel 17. While it is well known that frictional losses prevent obtaining power of the same magnitude from the upwardly transported particulate material, the system is useful in moving the particulate material rather efficiently during non-peak periods.

Figure 2:
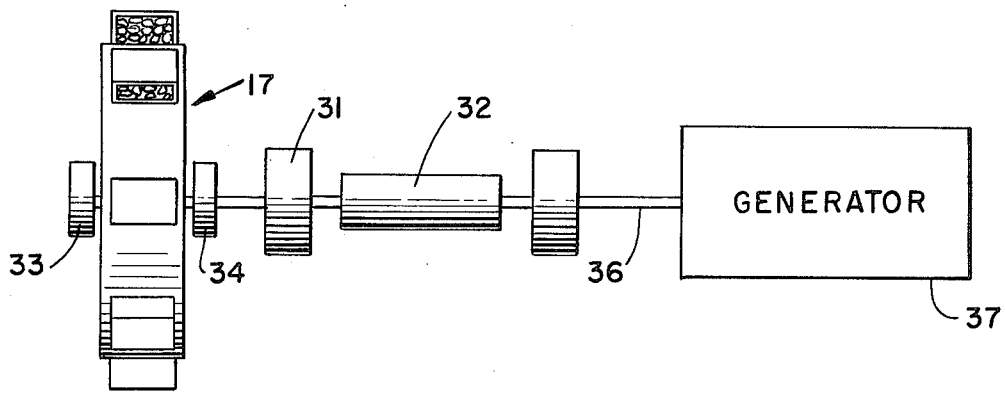
FIG. 2 is a top plan view of one embodiment of the invention showing one system for harnessing the power generated by the driven wheel.

From FIG. 2 it will be noted that the driven wheel 17 may be coupled by means of drive shaft 36 through clutch 31 to a speed increasing gear means 32. The wheel 17 is seen to be mounted on low friction journalling means 33 and 34 such as steel bearings. Another clutch means is positioned at the other side of the speed increasing gear means 32. Finally, the drive shaft 36 drives a 60 cycle alternating current 12 pole generator 37. The voltage therefrom would be 240 volts and has an output of 5KW. The wheel is designed to rotate at about 12 r.p.m. and the output in the speed increasing means provides 600 r.p.m. The wheel has a diameter of 12 feet with a bucket spaced every 2.2 feet. The buckets have a 1 cubic foot capacity. The net horsepower output at 12 r.p.m. will be 12.8.

In another embodiment, especially useful in redistributing the particulate material to areas away from the cliff of a pit as in closing a strip mine, the driven wheel 17 is directly geared to an endless conveyor belt suitably mounted for lateral movement so that the particulate material may be spread over a wide area.

It will be seen that the hopper, chute, driven wheel and the electric generator, if one is employed may be suitably mounted in a single tower-like arrangement. The tower may be mounted on caterpillar treads or wheels for movement from site to site.

It is well understood that other embodiments and modifications will come to mind, all within the purview of the instant invention.

What is claimed is:

1. A device for obtaining rotative force, said device comprising a man-dug depression in the ground and an apparatus for obtaining rotative force from particulate material comprising a reservoir means for holding particulate material, means for feeding said particulate material into said reservoir means on a first level, an elongated passageway positioned below said reservoir means and in communication therewith, a driven wheel means at a second level below the lower terminus of said passageway, said driven wheel means adapted and constructed to be driven by said particulate material, said driven wheel means being rotatable on a horizontal axle, means positioned below said driven wheel means at a third level for distributing said particulate material away from said driven wheel means, said apparatus being wholly positioned in said depression.

2. The apparatus of claim 1, wherein there is included means adjacent the distributing means to raise a portion of the particulate material to said first level and said raising means is positioned to receive said distributed particulate material below said second level.

3. The apparatus of claim 2, wherein the raising means comprises a vertically oriented endless conveyor system having buckets thereon.

4. The apparatus of claim 1, wherein the particulate material is crushed stone and the depression is a quarry.

5. The apparatus of claim 1, wherein the driven wheel operates an electric generator through transmission means.

6. The apparatus of claim 5, wherein the driven wheel has spaced buckets on the periphery thereof for receiving the particulate material, said buckets are adapted and constructed to contain 1 cubic foot of said material, said driven wheel has a diameter of substantially 12 feet, said driven wheel operated at a speed of 12 revolutions per minute, said transmission means is adapted and constructed to drive said electric generator at 600 revolutions per minute, and said electric generator is a 12 pole alternating current generator.

7. A method for obtaining rotative force comprising removing a portion of the overlying strata of the earth to produce a depression, comminuting at least a portion of said strata to produce particulate material, collecting a quantity of such material at a location at substantially the top portion of said depression, then discharging portions of said particulate material into the depression through a defined passageway, impinging said particulate material onto a responsive rotatable driven means located in the depression to thereby rotate said means, and thereafter moving said particulate material away from said driven means.

8. The method of claim 1, including the step of rotating an electric generator by the rotative force which is developed.

* * * * *